United States Patent
Fischer et al.

(10) Patent No.: US 6,893,043 B2
(45) Date of Patent: May 17, 2005

(54) SAFETY ARRANGEMENT FOR MOTOR VEHICLES

(75) Inventors: Jochem Fischer, Marbach/Neckar (DE); Udo Klasfauseweh, Gütersloh (DE)

(73) Assignee: Benteler Automobiltechnik GmbH, Paderhorn (DE)

( * ) Notice: Subject to any disclaimer, the term of this patent is extended or adjusted under 35 U.S.C. 154(b) by 6 days.

(21) Appl. No.: 10/190,750

(22) Filed: Jul. 8, 2002

(65) Prior Publication Data

US 2003/0038461 A1 Feb. 27, 2003

(30) Foreign Application Priority Data

Jul. 10, 2001  (DE) ......................................... 101 33 454

(51) Int. Cl.[7] ............................................. B60R 21/22
(52) U.S. Cl. .................................................. 280/730.2
(58) Field of Search ........................... 280/730.2, 730.1, 280/728.2

(56) References Cited

U.S. PATENT DOCUMENTS

| | | | | |
|---|---|---|---|---|
| 5,362,097 A | * | 11/1994 | Barske | 280/730.1 |
| 5,704,637 A | * | 1/1998 | Matsuura et al. | 280/730.1 |
| 5,775,726 A | * | 7/1998 | Timothy et al. | 280/730.1 |
| 5,988,673 A | * | 11/1999 | Stavermann | 280/730.1 |
| 5,992,877 A | * | 11/1999 | Gray | 280/730.1 |
| 6,103,984 A | * | 8/2000 | Bowers et al. | 280/730.2 |
| 6,149,195 A | * | 11/2000 | Faigle | 280/749 |
| 6,237,943 B1 | * | 5/2001 | Brown et al. | 280/730.2 |

FOREIGN PATENT DOCUMENTS

| | | |
|---|---|---|
| DE | 43 04 919 A1 | 9/1993 |
| DE | 197 58 024 A1 | 7/1999 |
| DE | 199 55 023 A1 | 5/2000 |

\* cited by examiner

*Primary Examiner*—Son T. Nguyen
(74) *Attorney, Agent, or Firm*—Henry M. Feiereisen; Ursula B. Day

(57) ABSTRACT

A safety arrangement for a motor vehicle, includes at least one airbag disposed in a roof frame of a vehicle body. A pressure gas source, positioned remote to the airbag, is fluidly connected with the airbag by a connection line for supply of a pressure gas to the airbag and inflation thereof. The connection line is formed by a hollow space of the roof frame or the roof frame itself, whereby the roof frame and/or the hollow space is formed by metal sheets connected to one another in a fluid-tight manner by an adhesive joint.

7 Claims, 3 Drawing Sheets

SAFETY ARRANGEMENT FOR MOTOR VEHICLES

CROSS-REFERENCES TO RELATED APPLICATIONS

This application claims the priority of German Patent Application Ser. No. 101 33 454.0, filed Jul. 10, 2001, pursuant to 35 U.S.C. 119(a)–(d), the subject matter of which is incorporated herein by reference.

BACKGROUND OF THE INVENTION

The present invention relates, in general, to a safety arrangement for motor vehicles.

Side airbag systems arranged in the area of the roof frame of a motor vehicle are activated to protect passengers from crashing against the vehicle door or the roof frame in the event of a side impact collision or rollover. Conventional side airbag systems are typically installed as a complete module. Supply of pressure gas to the side airbag module from a pressure gas source is realized through incorporation of lance-like fill pipes, which connect the pressure gas source with the airbag module. The pressure gas source is normally a gas cartridge, which oftentimes is disposed in the area of the "A" or windshield pillar. On occasions, the gas cartridge may also be arranged in other parts of the vehicle, for example, underneath the "C" or rear pillar in the trunk, as described, for example, in German patent publication DE 197 58 024 A1.

Conventional side airbag systems suffer shortcomings because of the need for additional installation space to accommodate the fill pipes in the roof frame, and the added vehicle weight which increases with increasing length of the fill pipes, so that the fuel consumption is adversely affected.

It would therefore be desirable and advantageous to provide an improved safety arrangement for motor vehicles to obviate prior art shortcomings and to configure the fluid connection between airbag and remote pressure gas source in a way as to save installation space and weight.

SUMMARY OF THE INVENTION

According to one aspect of the present invention, a safety arrangement for a motor vehicle, includes an airbag disposed in a roof frame of a vehicle body; a pressure gas source disposed remote to the airbag; and a connection line for fluidly connecting the pressure gas source with the airbag for filling the airbag with a pressure gas, wherein the connection line is formed by a hollow space of the roof frame or the roof frame itself, and wherein the roof frame and/or the hollow space is formed by metal sheets connected to one another in a fluid-tight manner by an adhesive joint.

The present invention resolves prior art problems by exploiting existing hollow spaces for fluid conduction so that the need for additional lance systems is eliminated. As the roof frame of current vehicle designs has a hollow space structure, existing spaces are exploited in an optimum manner. The volume of the hollow space in a roof frame is typically greater than the volume of conventional lance systems so that a separate hollow space in the roof frame can be used having a volume that is smaller than the volume of the entire roof frame. As a consequence, it is not necessary to fill the entire volume of the roof frame with pressure gas, and the use of smaller and light pressure gas sources may be possible.

Depending on the configuration of the motor vehicle, in particular of the roof frame, it may be conceivable to configure the roof frame itself as hollow space to provide the fluid communication between the pressure gas source and the airbag.

Implementation of a greatest possible fluid tightness of the hollow space or roof frame is essential for use as connection line. Accordingly, the metal sheets for forming the roof frame or hollow space are connected to one another in fluid-tight manner, suitably by an adhesive joint.

Normally, the roof frame is connected to the "A", "B", or "C/D" pillars of the vehicle body through welding, whereby openings are present between the pillars and the roof frame. In order to enable a use of the roof frame, or hollow space in the roof frame, as connection line, those existing openings to the pillars are sealed off.

As substantial rigidity of a vehicle body is demanded, the roof frame is normally constructed of relatively great cross section. Thus, it is principally possible to exploit the cross section of the roof frame for placement of a pressure gas source. Depending on the size of the hollow space in the roof frame, the pressure gas source may be fitted directly in the hollow space or in the roof frame. Of course, the pressure gas source may also be accommodated in other zones of the vehicle, if desired, whereby supply of pressure gas to the airbag system requires, if at all, only relatively short lance systems as a result of the use of hollow spaces of the roof frame in order to connect the pressure gas source with the hollow spaces.

A safety arrangement according to the present invention has the further advantage that the use of the roof frame as connection line results in elevated internal pressure in the roof frame in the event of a crash. This internal pressure results in a momentary stiffening of the hollow space structure, especially in view of the explosion-like pressure build-up.

The airbag of the safety arrangement according to the present invention is attached to the hollow space or connection line such that a secure inflation of the airbag is ensured. Hereby, lateral exit openings may branch off from the connection line for supply of pressure gas to the airbag or single airbag modules. Optionally, baffles may be disposed inside the connection line to divert a partial gas flow to the airbag and thus to prevent the pressure gas from streaming only in the main flow direction through the connection line as a consequence of the high gas speed. Of course, it is also possible to provide the connection line in the main flow direction of the pressure gas, as viewed downstream of the exit opening, with a cross sectional restriction to realize a pressure backup and an escape of pressure gas through the exit opening.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
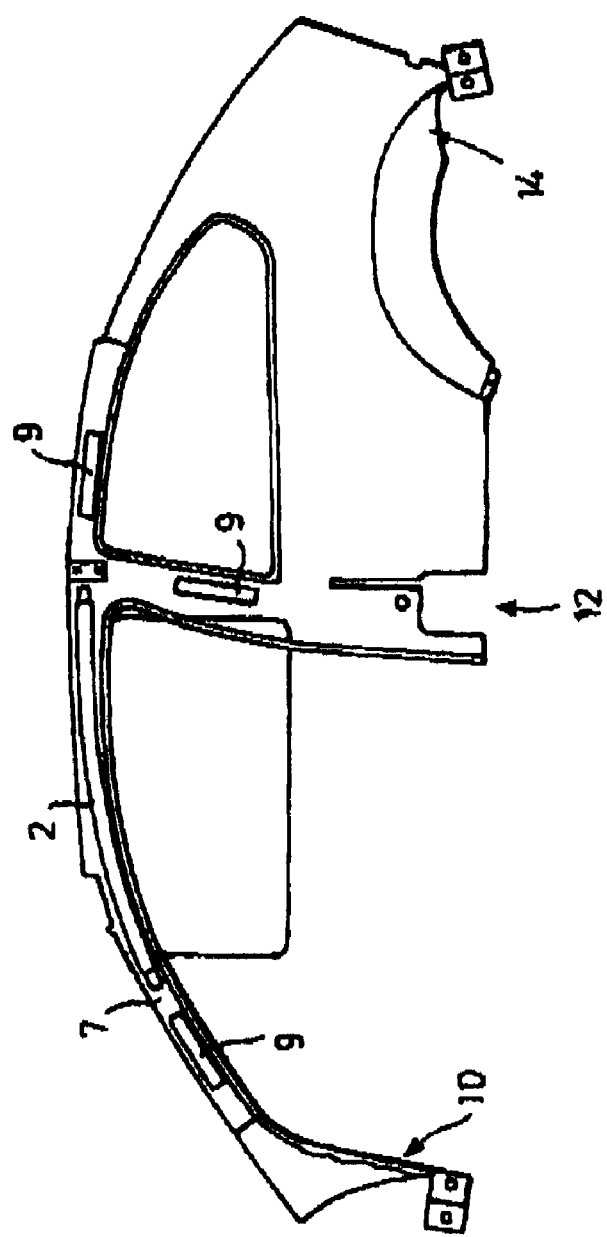
FIG. 1 is a schematic view of a motor vehicle body embodying a safety arrangement according to the present invention.

Throughout all the Figures, same or corresponding elements are generally indicated by same reference numerals.

Figure 2:
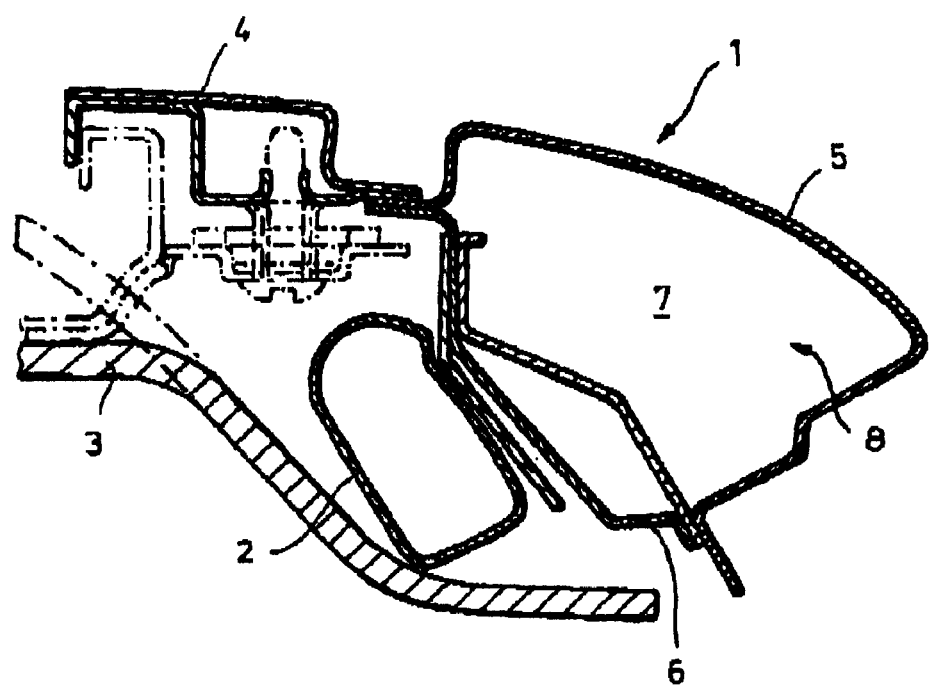
FIG. 2 is a vertical cross sectional illustration of a body portion of the vehicle roof of the motor vehicle.

Turning now to the drawing, and in particular to FIG. 1, there is shown a schematic view of an outer body panel of a motor vehicle body according to the present invention. The outer body panel includes a roof frame 1 (FIG. 2), a windshield or "A" pillar 10, a center or "B" pillar 12, and rear or C/D pillars 14. As shown in more detail in FIG. 2, the roof frame 1 of the vehicle body has incorporated therein a safety arrangement, which includes an airbag 2 disposed in an area of vehicle inner side of the roof frame 1. The roof frame 1 includes an outer shell 5 made from a metallic material, e.g., sheet metal, and an inner shell 6 made from a metallic material, e.g., sheet metal, and connected to the outer shell 5 in fluid-tight manner, e.g., by an adhesive joint. Toward the vehicle interior, the inner shell 6 is covered by an inner or roof lining 3. Reference numeral 4 designates the vehicle roof, which further includes components that, however, do not form part of the present invention and thus are not described in more detail for the sake of simplicity.

The inner and outer shells 5, 6 bound a hollow space 7 which extends in longitudinal direction of the motor vehicle, i.e. in a direction of the drawing plane. In accordance with the present invention, the hollow space 7 is utilized as connection line 8 for conducting a pressure gas from a pressure gas source 9 (FIG. 1) to the airbag 2. Inflation of the airbag 2 is implemented through sudden release of pressure gas from the pressure gas source 9 under great pressure and great speed into the hollow space 7 of the roof frame 1 and conduction of the pressure gas via the connection line 8 and not shown feeds to the airbag 2.

Figure 3:
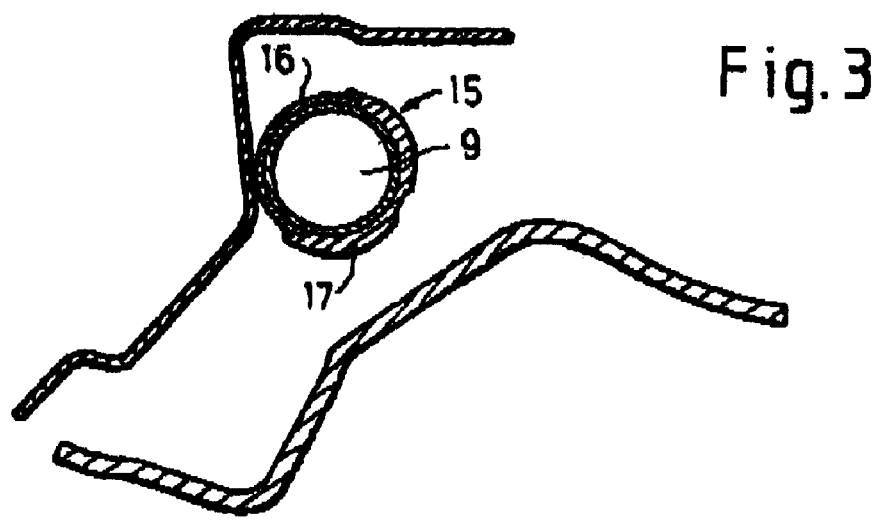
FIG. 3 is a sectional cutaway view of the vehicle roof having incorporated therein a pressure gas source.
Figure 4:
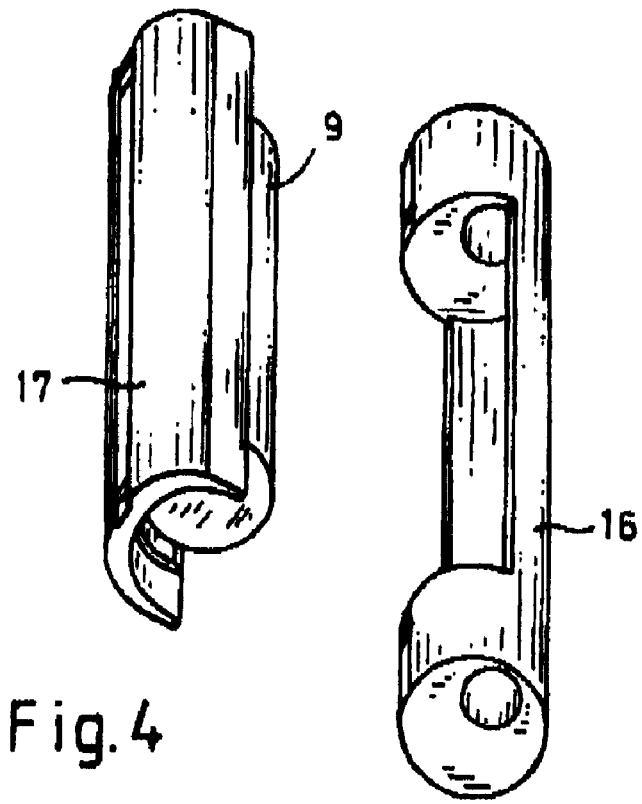
FIG. 4 is an exploded perspective view of the pressure gas source.

As shown in FIGS. 3 and 4, the pressure gas source 9 has a cartridge-like configuration and is secured in the roof frame 1 by a holding device 15 comprised of two complementary casing parts 16, 17 which form a receptacle for receiving the pressure gas source 9, when connected together.

While the invention has been illustrated and described as embodied in a safety arrangement for motor vehicles, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A roof frame with integrated side airbag deployment system for use in a motor vehicle, comprising:

an outer shell;

an inner shell connected to the outer shell in a fluid-tight manner and defining a hollow space therebetween;

a roof lining disposed at a side of the inner shelf facing away from the outer shell; the roof lining and the inner shell forming a cavity;

an airbag disposed in the cavity between the inner shell and the roof lining;

a pressure gas source located in a remote location relative to the airbag; and outside the fluidtight space; wherein the fluidtight hollow space acts as a connection line between the remote pressure gas source and the airbag.

2. The safety arrangement of claim 1, wherein the vehicle body includes an "A" pillar, a "B" pillar and "C/D" pillars, wherein the hollow space extends from the "A" pillar to the "C/D" pillars, with openings between the roof frame and the "A", "B" and "C/D" pillars being sealed off.

3. The safety arrangement of claim 1, wherein the pressure gas source is disposed in the roof frame.

4. The safety arrangement of claim 1, wherein the connection line is connected in the main flow direction of the pressure gas downstream of an exit opening with a cross sectional restriction to realize a pressure backup and an escape of pressure gas through the exit opening.

5. The safety arrangement of claim 1, wherein the connection line has incorporated therein a baffle to divert a partial gas flow to the airbag and to prevent a flow of pressure gas only in a main flow direction through the connection line.

6. The roof frame of claim 1, wherein the outer and inner shells are each made of sheet metal.

7. The roof frame of claim 1, wherein the outer and inner shells are connected to one another by an adhesive joint.

* * * * *

UNITED STATES PATENT AND TRADEMARK OFFICE
CERTIFICATE OF CORRECTION

PATENT NO. : 6,893,043 B2
DATED : May 17, 2005
INVENTOR(S) : Jochem Fischer and Udo Klasfauseweh It is certified that error appears in the above-identified patent and that said Letters Patent is hereby corrected as shown below:

Column 4,
Line 33, replace "connected" with the correct -- constructed --.

Signed and Sealed this

Thirtieth Day of August, 2005

JON W. DUDAS
*Director of the United States Patent and Trademark Office*